March 23, 1926.  1,578,170
A. H. REIBER
WARNING SIGNAL
Filed April 25, 1925   2 Sheets-Sheet 1

Inventor
Albert H. Reiber
By William A. Strauch
Attorney

March 23, 1926.
A. H. REIBER
1,578,170
WARNING SIGNAL
Filed April 25, 1925   2 Sheets-Sheet 2
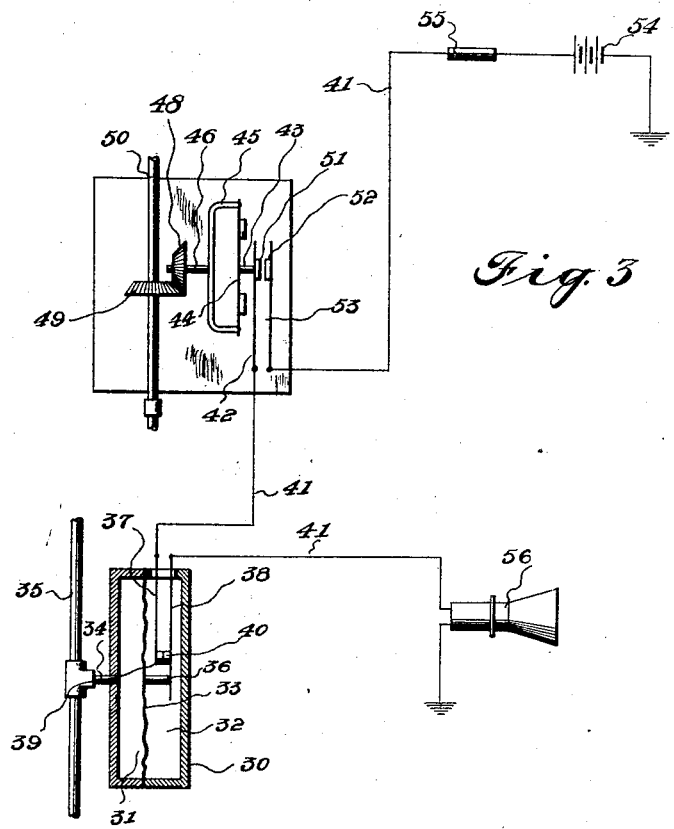
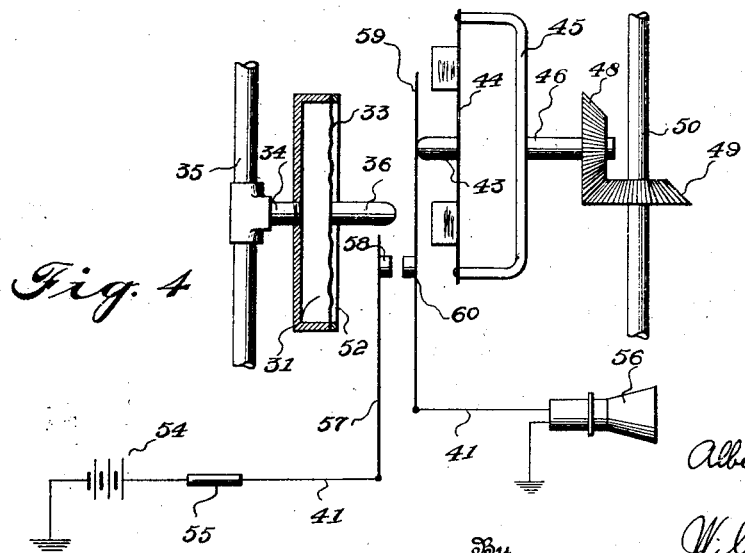
Inventor
Albert H. Reiber
By William A. Strauch
Attorney Patented Mar. 23, 1926.

1,578,170

UNITED STATES PATENT OFFICE.

ALBERT H. REIBER, OF JACKSON HEIGHTS, NEW YORK.

WARNING SIGNAL.

Application filed April 25, 1925. Serial No. 25,772.

*To all whom it may concern:*

Be it known that I, ALBERT H. REIBER, a citizen of the United States, residing at Jackson Heights, in the county of Queens, State of New York, have invented new and useful Improvements in Warning Signals, of which the following is a specification.

The present invention relates to control and warning signal systems for pressure lubricating or fluid pressure pumping systems such as are used for lubricating motor vehicles, aeroplanes, and internal combustion engines, high speed steam turbines and the like; or for pumping systems for refrigeration, oil heating, water pressure systems and the like.

More particularly the invention relates to the provision of an audible warning signal when a lubricating system or pump system fails to function properly, and to indicate when predetermined pressures or speeds or both are attained. While the preferred embodiments hereinafter set forth are especially adapted for automobile, aeroplane, and like lubricating systems, it will be understood that many other applications of the principles may be made.

As is well known, failure of lubrication or pumping systems generally, may occur from lack of sufficient lubricant, or fluid, or failure of pump gears and mechanisms and from numerous other causes. Failure of oil pump gears and mechanisms usually occurs while operating at high speeds, with the result that serious injury to moving parts and bearings occurs before any indication of trouble is given. Various forms of visible indicating devices have been provided for recording failure of the lubricating systems to function, but these are all open to the serious objection that the indication of danger is seldom seen before the harm has been done and such prior devices have accordingly failed to perform their intended functions for the reason that a driver or pilot cannot continually watch a visible signal. On the contrary, it is well known that any unusual sound in connection with such devices immediately attracts attention of the operatives, and by creating a warning sound a much more effective warning is given. By utilizing this well known reaction, I have provided highly successful mechanical and electrical devices.

Until the speeds of rotating parts have built up to a predetermined value, there is little danger from failure of oil pressures to build up. Also starting from rest ordinarily certain speeds must be attained before normal pressures are reached in the lubricating system. For these reasons I have provided warning systems in which the signals are under joint speed and pressure control. While electrical arrangements are shown, the preferred embodiment of my invention is entirely mechanical in order to avoid so far as possible interference with or addition to the usual ignition, lighting or other circuits.

It is the practice in many motor trucks to provide a speed lock which prevents operation of the truck above predetermined speeds. This is highly undesirable as in emergencies high speeds may be essential. In one form of my invention a signal is provided which may be set to indicate lack of proper lubricant pressure at one predetermined speed and to give a warning when a second predetermined safe speed is exceeded. In this way high speeds in emergencies may be utilized with an effective warning against excessive speeds in ordinary operation.

In certain pumping systems it is desirable to stop pumping at predetermined pressures as for example when a stand pipe or storage tank is filled to a predetermined level. In a modified form of my invention an automatic signal or motor stop is provided which functions only at predetermined speeds and pressures.

Accordingly the objects of the invention are to provide simplified and reliable control and warning signal arrangements for lubricating or fluid pressure systems; to provide warning signal systems which are under a joint speed and pressure control; and to provide an audible warning signal device for systems as above set forth and to provide an audible warning signal which is wholly mechanical.

Other objects of the invention are such as may be attained by a utilization of the principles and apparatus hereinafter set forth and defined in the terms of the appended claims.

Referring to the drawings:

Figure 3 illustrates diagrammatically an electrical form of the invention in which separate speed and pressure controlled contacts are utilized.

Figure 4 illustrates an electrical form of the invention in which a single contact is controlled by the joint action of a pressure controlled and a speed controlled device.

Figure 1:
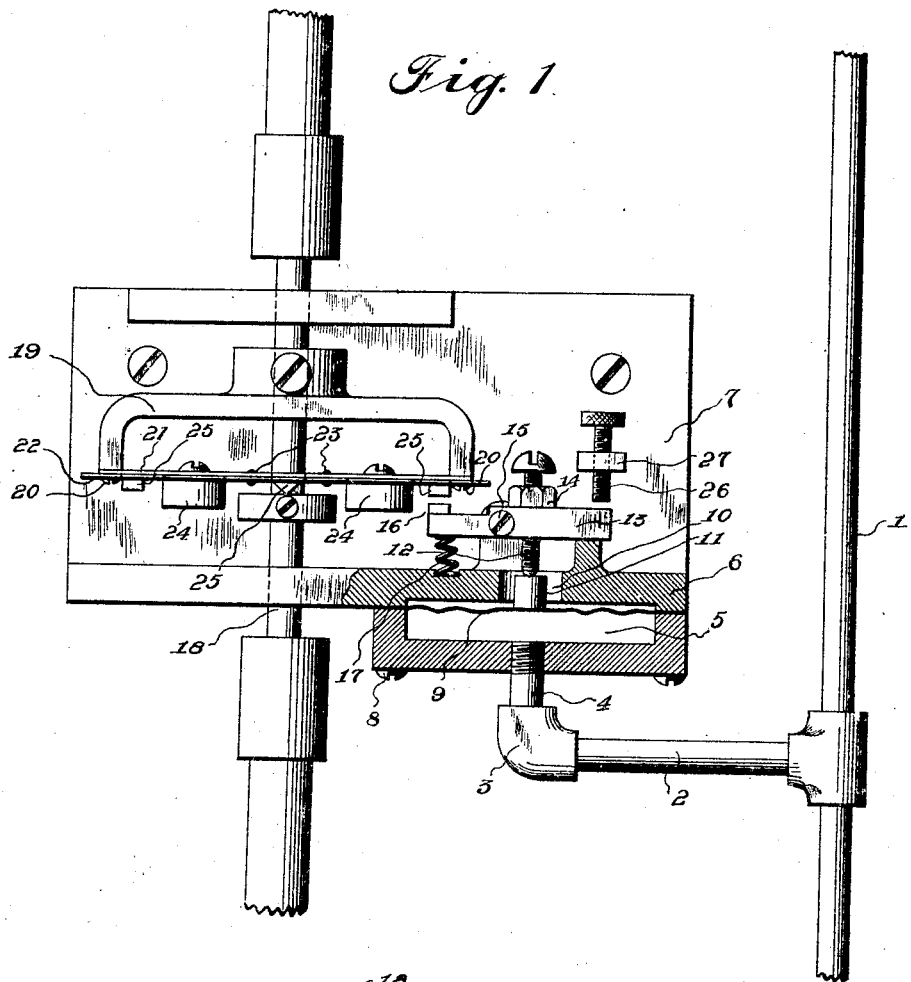
Figure 1 shows a mechanical embodiment of my invention with parts at rest.
Figure 2:
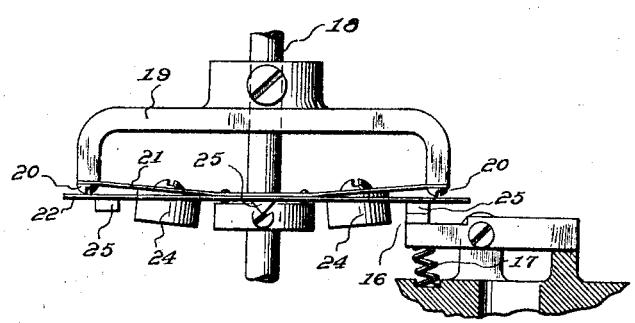
Figure 2 is a fragmental view of the parts shown in Figure 1 assumed when in motion and the pressure fails to rise.

Referring to Figs. 1 and 2, 1 represents an oil or fluid pressure line from which extends a branch pipe 2 into an elbow 3. From the elbow 3 a connection 4 extends into a closed compartment or chamber 5. Chamber 5 is secured to a plate or extension 6 of supporting structure 7 by screws 8 or in any other suitable manner. Spanning the top of compartment 5 is a flexible diaphragm 9. In the plate 6 adjacent the center of disc 9 is an opening 10. Secured to the exterior surface of the diaphragm 9 and extending into the opening 10 is a projection 11 adapted to contact with the end of a set screw 12 threaded into and extending through arm 13. Disposed between the head of the threaded bolt 12 and the upper face of the arm 13 is a lock nut 14. The arm 13 is pivotally mounted upon an abutment extending from the plate 6 by means of a screw 15. Secured to an end of arm 13 is a contact point or projection 16. A spring 17 seated between arm 13 and plate 6 forces the arm about its pivot 15 and holds the end of screw 12 in engagement with projection 11.

Disposed adjacent the arm 13 and carried by a rotating shaft 18 which may be an automobile speedometer shaft, is a governor member 19 secured to and rotatable with shaft 18. Secured to member 19 by means of screws 20 is a flexible metallic strip 21. A disc or diaphragm 22 is riveted or otherwise secured to strip 21 at points 23. Secured to the strip 21 are weights 24 which extend through holes in disc 22, and screws 20 extend through slots in strip 21 so that as the governor rotates rapidly the strip 21 and disc or diaphragm 22 assume the relative positions shown in Fig. 2. As the speed decreases the parts tend to assume the relation shown in Figure 1. Secured to disc 22 are a plurality of projections 25 which are adapted to engage projection 16 on member 13 when strip 21 is flexed as more fully hereinafter set forth. An adjustable stop screw 26 threaded through and supported in a projection 27 of support 7 is provided when a warning is to be given that a predetermined speed is being exceeded.

In operation, the parts are so proportioned and arranged that when the speed of shaft 18 reaches a predetermined point, corresponding for example to a vehicle speed on automobiles of fifteen miles per hour or above, and the oil pressure fails to rise to proper values for the given speeds, projection 16 will be in the path of rotating projections 25 on disc 22, as shown in Fig. 2. This will set disc 22 into rapid mechanical vibration and will give a peculiar audible warning that the proper oil or fluid pressure has not developed. The engine or rotating parts may then be stopped and the trouble ascertained before serious damage occurs. If the oil reaches the proper pressures for the speed of the rotating parts before the governor parts are flexed as shown in Fig. 2, oil pressure in chamber 5 will force diaphragm 9 outward and member 11 will press against screw 12 forcing arm 13 about pivot 15. Projection 16 will be removed from the path of projection 25 and no signal will be given. If while the parts are running the pressure drops for any reason below a safe value diaphragm 9 will move inward and spring 17 will force projection 16 into the path of projections 25 setting up the audible warning vibrations of disc 22. It will be seen that a wholly mechanical audible warning mechanism is provided which will function immediately upon a failure of oil pressure at or over a predetermined speed.

When a high speed warning is desired stop screw 26 is provided. As the speeds rise the pressure will increase and the deflection of strips 21 will increase simultaneously. Contact 16 will be held out of the path of contacts 25 by the increasing pressure in compartment 5 until a failure of proper pressure occurs or until arm 13 engages stop 26. When stop 26 is engaged contact 16 will be held in the path of contacts 25 and a high speed signal will be given.

In the diagrammatic showing of my invention in Fig. 3, 30 represents a compartment divided into two sections 31 and 32 by means of diaphragm 33. Section 31 is closed and receives a branch pipe 34 extending from the pipe 35 of the oil or fluid circulating system. Disposed within the section 32, and secured to the external surface of the diaphragm 33 is a rod 36. Within the section 32 are also disposed electrical contact springs 37 and 38 provided with contact points 39 and 40. Connected to springs 37 by means of a conductor 41 is a contact spring 42 which is engaged by a projection 43 secured to a weighted flexible spring member 44 of a governor 45. Governor 45 is mounted on a shaft 46 which is rotated by bevel pinion 48 driven by a bevel gear 49 from a speedometer or like shaft 50. Spring 42 has secured thereto a contact 51 which is adapted to engage a contact 52 carried by a contact spring 53. An electrical circuit is completed from ground through battery 54, fuse 55, conductors 41, spring 53, contacts 52 and 51, spring 42, spring 37, contacts 39 and 40, spring 38 through a horn or other signal member 56 to ground.

In operation when the speed of shaft 50 reaches a predetermined value, corresponding for example to a motor car speed of fifteen miles per hour, the weights on member 44 cause flexing thereof and member 43 presses against spring 42, closing contacts 51 and 52. If at this time the oil pressure in chamber 31 has not reached the proper value contacts 39 and 40 will be closed and a circuit will be completed from the battery 54 through the signaling device 56. If the oil pressure reaches the proper value, contacts 39 and 40 will be held open by the movement of diaphragm 33 and member 36. If while in operation, the oil fails, the contacts 39 and 40 close causing a warning signal to be given.

The arrangement shown in Figure 3 may be utilized as a signal to indicate attainment of predetermined pressures by arranging contacts 39 and 40 to be open with low pressures and to be closed by member 36 when the predetermined pressure is reached. Member 56 may be either a warning signal or an automatic motor or engine. Attainment of predetermined pressures in stand pipes or storage tanks may in this manner be indicated. When the motor or engine stops, governor 45 will come to rest permitting contacts 51 and 52 to open. In this manner the signal or stop is automatically controlled, and manual resetting is avoided eliminating the possibility of failure to reset by an attendant.

In the form shown in Figure 4 the arrangement of Fig. 3 is simplified so that only one set of contacts are utilized to control the signal 56. A fixed contact spring 57 is connected to the battery 54 and has secured thereto an electrical contact 58. Connected to signal 56 is a long contact spring 59 upon which is secured a contact 60 adapted to engage contact 58 to complete the circuit to signal 56. Speed controlled projection 43 and pressure controlled projection 36 are so arranged that when the speed of shaft 50 reaches or goes beyond a predetermined value, if the pressure is not at the proper value contacts 58 and 60 will be closed causing a warning signal to be given. If the pressure in chamber 31 has risen to the proper value member 36 will hold contacts 58 and 60 separated preventing the signal and in this case the upper end of spring 59 will be flexed or bent around the end of member 36. If while the parts are operating the pressure drops, then spring 59 will close the contacts 58 and 60.

It will be understood that when applied to an automobile, signal 56 may be the usual horn with the control circuits auxiliary to the ordinary horn circuit.

Having described preferred embodiments of my invention what is desired to be secured by Letters Patent and claimed as new is:

1. A signaling system comprising pressure operated means; speed controlled means; and signaling means under the joint control of said pressure operated means and said speed controlled means.

2. The system as set forth in claim 1 in which the signaling means comprises an audible signal device.

3. The combination as set forth in claim 1 in which the means are entirely mechanical and adapted to give an audible signal.

4. The combination as set forth in claim 1 in which said signalling means comprises means for indicating a lack of proper pressure above predetermined speeds, and to indicate speeds of said speed controlled means in excess of a predetermined value at proper pressures.

5. A signal for fluid pressure pumping systems comprising a control means actuated by the fluid pressure in the system; a speed controlled device and signaling means under the joint control of said control means and said speed controlled device to indicate lack of pressure in said fluid pressure system.

6. The combination as set forth in claim 5 together with means for causing said signaling means to function when said proper pressures are attained above predetermined speeds of said speed controlled device.

7. A warning signal to indicate failure to pressure in systems comprising a pressure chamber connected with the main system; a flexible diaphragm actuated by the pressure in said chamber; a speed controlled device; contact means controlled by said diaphragm and said device; and signaling means controlled by said contacts.

8. The combination as set forth in claim 5 in which the speed controlled device comprises means for vibrating mechanically and setting up a mechanical warning tone when said contact means engage.

9. An audible signal for engine pressure lubricating systems comprising a diaphragm actuated by the pressure of the lubricant; contact means controlled by the movement of the diaphragm; a speed controlled device driven by the engine; and contact means controlled by the speed controlled device; said first mentioned contact means being adapted to engage said second mentioned contact means under predetermined pressure and speed conditions to control the emission of a warning signal.

10. The combination as set forth in claim 8 in which the speed controlled device comprises centrifugally operated members.

In testimony whereof, I affix my signature.

ALBERT H. REIBER.